United States Patent
Caridis et al.

[11] Patent Number: 6,146,678
[45] Date of Patent: Nov. 14, 2000

[54] METHOD OF COOKING FOOD PRODUCTS IN AN AIR IMPINGEMENT OVEN

[75] Inventors: Andrew A. Caridis, San Carlos; Anthony A. Caridis, Belmont; Clark K. Benson, Millbrae; Lernardo P. Murgel, San Francisco; James A. Padilla, Pacifica, all of Calif.

[73] Assignee: Heat and Control, Inc., Hayward, Calif.

[21] Appl. No.: 09/119,217

[22] Filed: Jul. 20, 1998

Related U.S. Application Data

[63] Continuation-in-part of application No. 08/956,014, Oct. 22, 1997, Pat. No. 5,934,178, which is a continuation-in-part of application No. 08/774,739, Jan. 4, 1997, abandoned.

[51] Int. Cl.[7] .................................................. A23L 1/00
[52] U.S. Cl. .............................................. 426/510; 426/523
[58] Field of Search .............................. 426/510, 511, 426/523; 99/330, 386, 443 C, 476, 477; 126/21 A

[56] References Cited

U.S. PATENT DOCUMENTS

| | | | |
|---|---|---|---|
| 2,804,697 | 9/1957 | Coffaro | 34/207 |
| 2,807,892 | 10/1957 | Gerrish | 34/103 |
| 2,997,085 | 8/1961 | Magnuson | 146/47 |
| 3,169,871 | 2/1965 | Macchi et al. | 99/1 |
| 3,199,224 | 8/1965 | Brown | 34/156 |
| 3,214,845 | 11/1965 | Huffman | 34/48 |
| 3,266,559 | 8/1966 | Osborne et al. | 159/49 |
| 3,739,491 | 6/1973 | Creapo et al. | 34/156 |
| 3,821,454 | 6/1974 | Lobel | 426/524 |
| 3,884,213 | 5/1975 | Smith | 126/21 A |
| 3,999,475 | 12/1976 | Roderick | 99/474 |
| 4,089,322 | 5/1978 | Guibert | 126/261 |
| 4,094,077 | 6/1978 | Schrader et al. | 34/155 |
| 4,127,945 | 12/1978 | Nöthen et al. | 34/18 |
| 4,153,236 | 5/1979 | Elhaus | 266/252 |
| 4,154,861 | 5/1979 | Smith | 426/466 |
| 4,197,659 | 4/1980 | Brinkhaus et al. | 34/155 |
| 4,235,023 | 11/1980 | Best | 34/31 |
| 4,289,792 | 9/1981 | Smith | 426/421 |
| 4,327,279 | 4/1982 | Guibert | 219/400 |
| 4,338,911 | 7/1982 | Smith | 126/21 A |
| 4,368,664 | 1/1983 | Smith et al. | 426/523 |
| 4,409,453 | 10/1983 | Smith | 219/10.55 A |
| 4,479,776 | 10/1984 | Smith | 432/144 |
| 4,492,839 | 1/1985 | Smith | 219/10.55 R |
| 4,523,391 | 6/1985 | Smith et al. | 34/225 |
| 4,591,333 | 5/1986 | Henke | 99/386 X |
| 4,614,660 | 9/1986 | Weibye | 426/511 |
| 4,679,542 | 7/1987 | Smith et al. | 126/21 A |
| 4,701,340 | 10/1987 | Bratton et al. | 426/511 |
| 5,025,775 | 6/1991 | Crisp | 126/21 A |
| 5,172,682 | 12/1992 | Luebke et al. | 219/400 X |
| 5,322,007 | 6/1994 | Caridis et al. | 99/443 C |
| 5,345,923 | 9/1994 | Luebke et al. | 99/339 X |
| 5,423,248 | 6/1995 | Smith et al. | 99/475 X |

FOREIGN PATENT DOCUMENTS 768878 2/1957 United Kingdom.

*Primary Examiner*—George C. Yeung
*Attorney, Agent, or Firm*—Donald N. MacIntosh; Flehr Hohbach Test Albritton & Herbert LLP

[57] ABSTRACT

An oven for continuous cooking of products carried upon a open mesh wire conveyor provides the impingement of a cooking vapor from air discharge structure having ports arrayed above and below the conveyor. The discharge ports extend laterally of the conveyor and communicate with upper and lower plenums each charged by blower fans which draw cooking vapor from low pressure corridors alongside the product conveyor. Gas, electric or thermo fluid heaters are disposed in the corridors. The discharge ports are in slot form disposed about the apex of a Vee shaped riser spaced from the adjacent riser to provide a low pressure flow channel communicating with the corridors giving a rapid velocity change of the cooking vapor from turbulent to a less turbulent flow. The distance for vapor travel between the upper discharge ports and the product carrying conveyor is variable. Temperature and moisture content of the process vapor can be changed to suit cooking conditions.

16 Claims, 6 Drawing Sheets

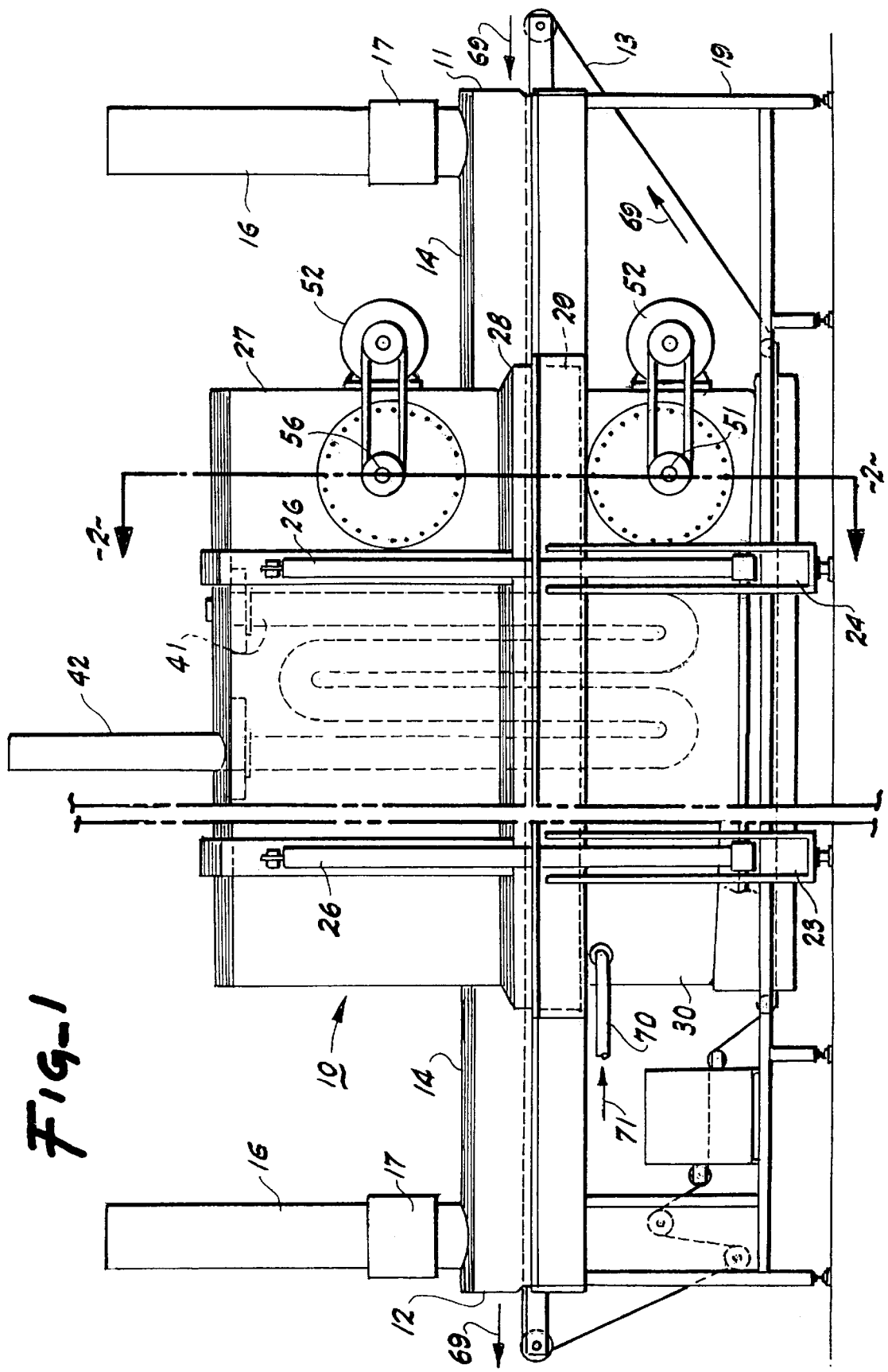

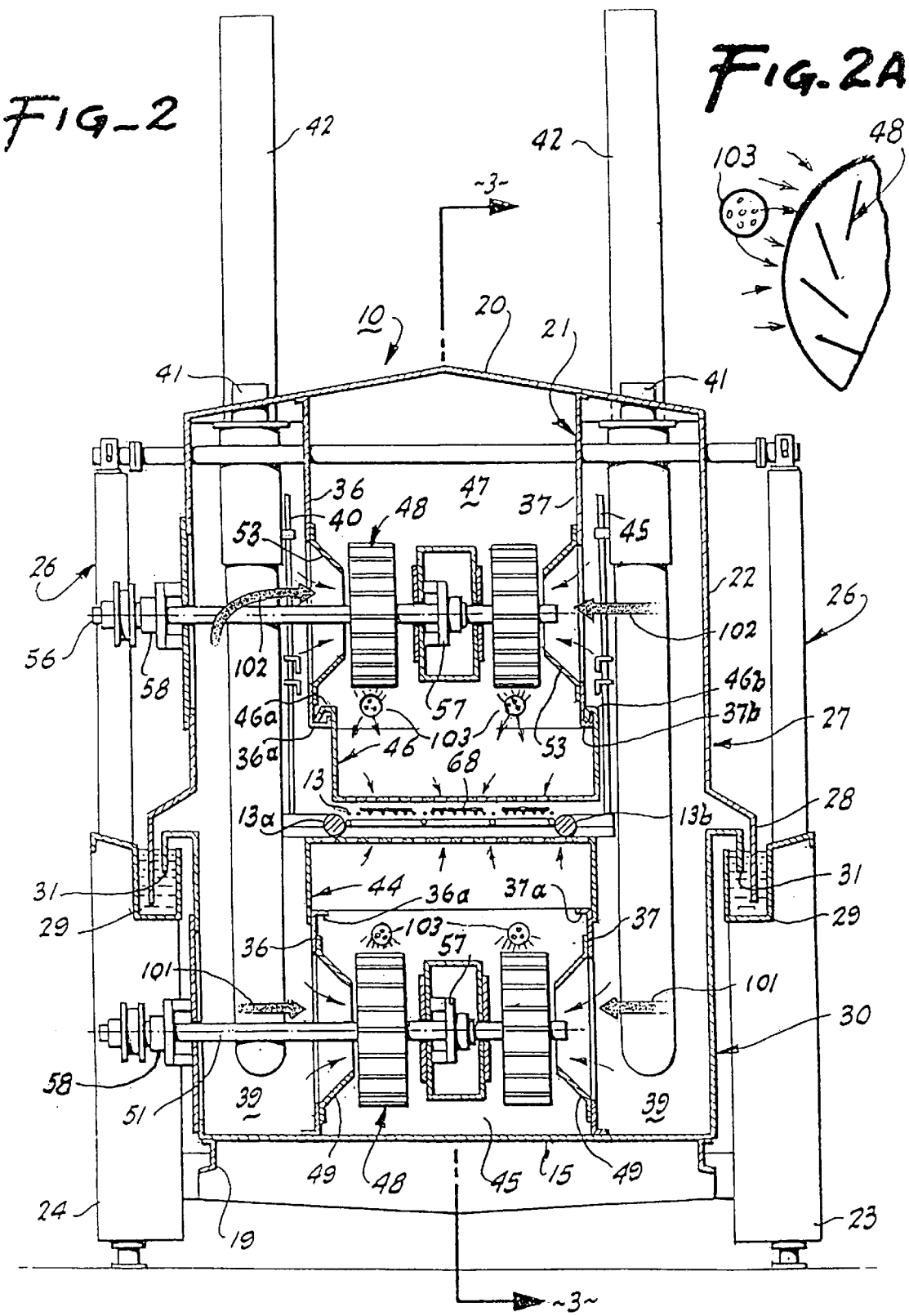

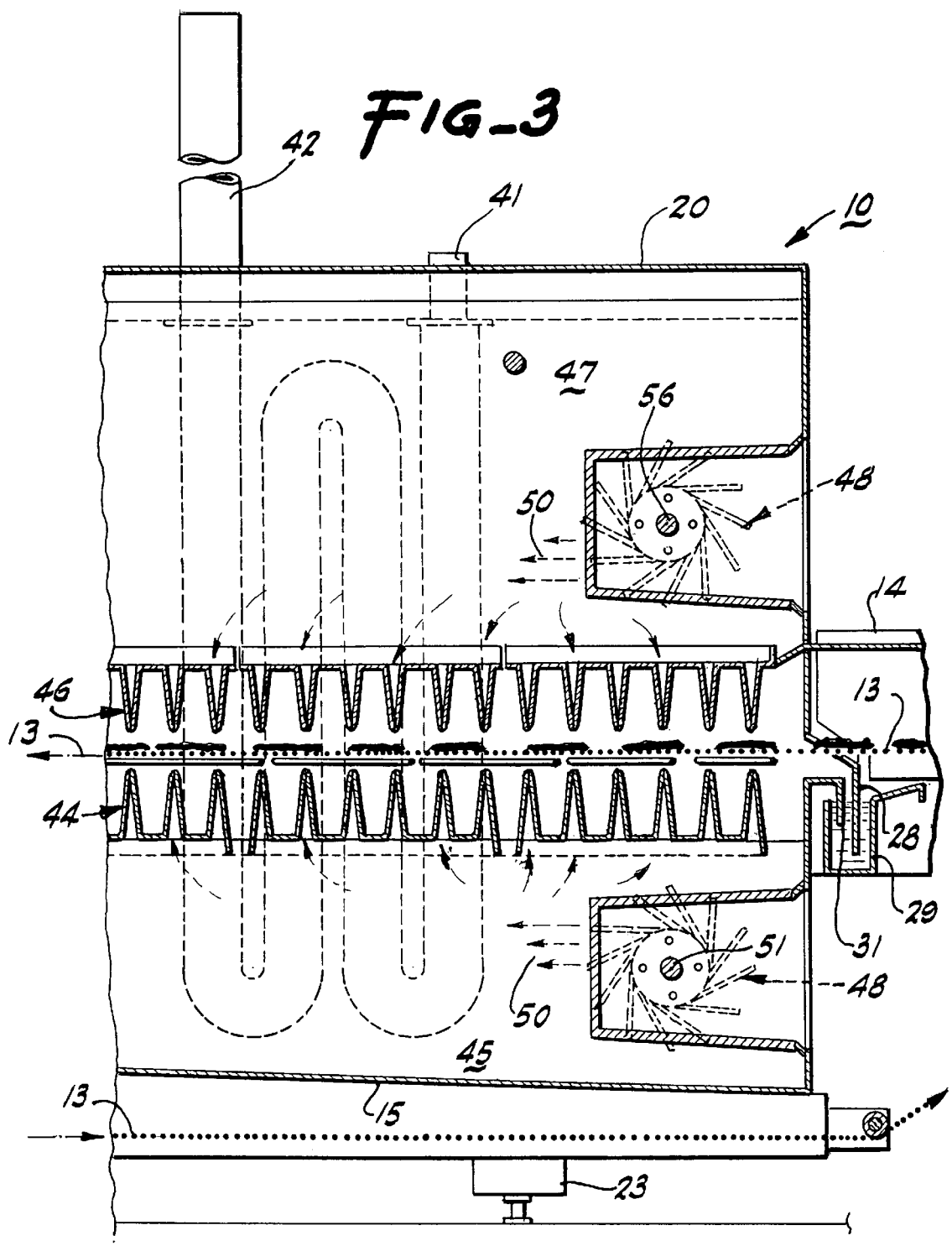

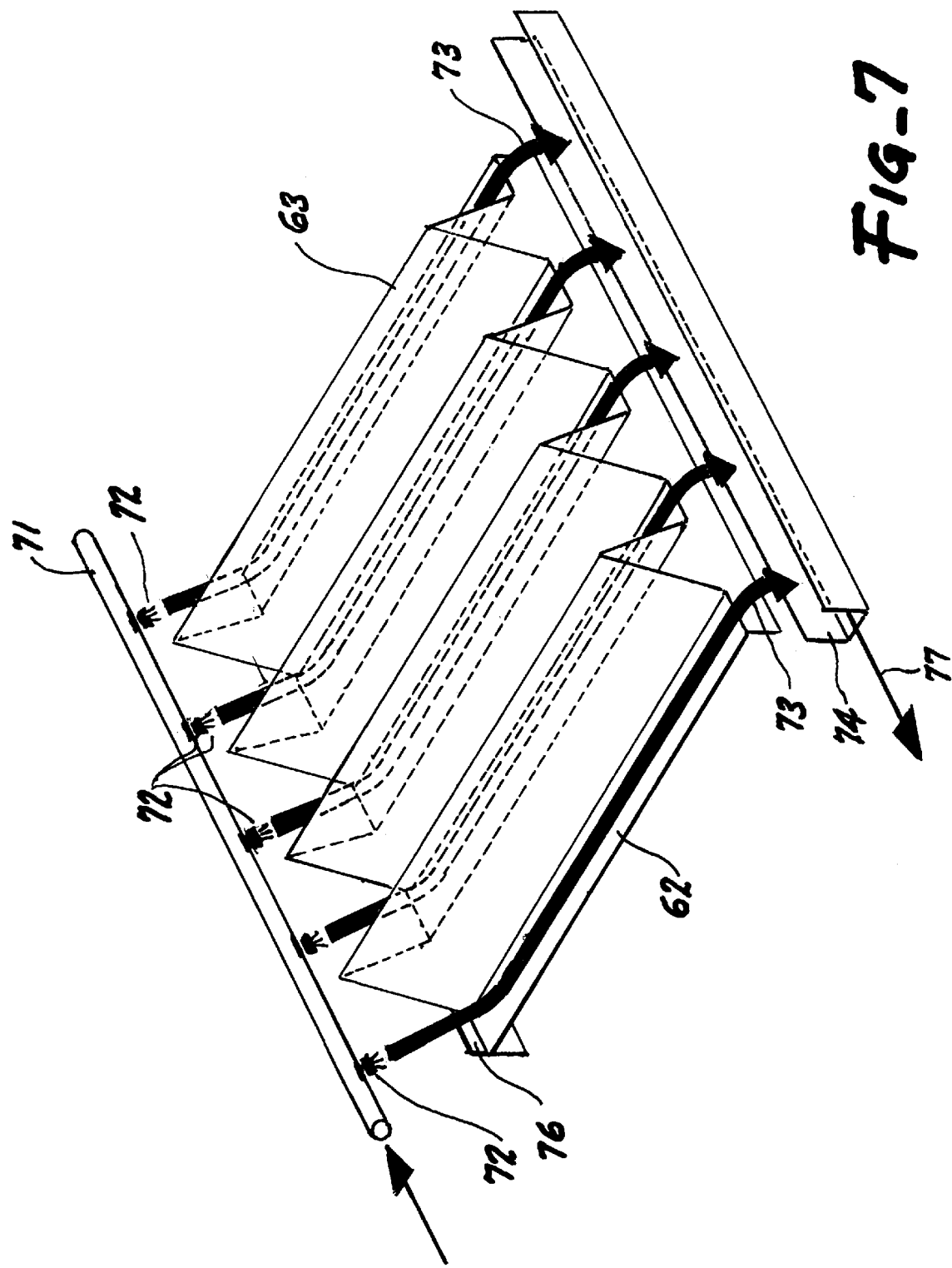

METHOD OF COOKING FOOD PRODUCTS IN AN AIR IMPINGEMENT OVEN

This is a continuation-in-part of application Ser. No. 08/956,014 filed Oct. 22, 1997, now U.S. Pat. No. 5,934,178, issued Aug. 10, 1999 which was a continuation-in-part of application Ser. No. 08/774,739 filed Jan. 4, 1997, now abandoned.

FIELD OF THE INVENTION

This invention is concerned with cooking food products and is particularly directed to cooking by impinging a process cooking vapor at a substantially uniform rate upon food products carried by a conveyor belt so that products at various positions on the belt are cooked at substantially the same rate with little if any overcooked or undercooked products.

BACKGROUND OF THE INVENTION

Use of impingement heating apparatus for thermally treating food products, such as in cooking or thawing, has been disclosed in the prior art. These conventional apparatuses typically employ columniating jets of temperature-controlled gas which impinge against the surface of a food product moving relatively thereto. Such devices are disclosed, for example, in U.S. Pat. Nos. 4,525,391, 4,338,911 and 4,154,861. When used for cooking purposes, certain of these devices are employed in combination with microwave generators for the apparent reason that impingement cooking, by itself, is not entirely satisfactory and needs supplementation from other cooking equipment.

In conventional conveyorized ovens which utilize impingement eating, high velocity jets of a temperature-controlled gas are directed against the surface of food products transported through the oven on a conveyor. The temperature controlled gas, or cooking vapor, is discharged from a blower or fan into a plenum or enclosed duct that directs the flow of vapor into a series of spaced-apart ducts extending transversely across the conveyor. These ducts are in turn adapted to direct the flow of gas into columniating orifices which causes the gas to impinge against the surface of the food products. These ducts are difficult to clean and require extra effort in the clean up operation with close attention to the details of complete cleaning required in the process food industry. Moreover, where the food products treated in the oven have a substantial fat content which will be rendered out as liquid fat it is highly desirable to recover the fat as a valuable by-product. Bacon processing companies sell such recovered fat to other industries such as for use in animal feed. Further in the oven is necessary to control the liquid fats so as to prevent combusting the fats and creating a smoke atmosphere in the oven causing an "off" taste to the main product.

Furthermore, those working with such ovens in the past have encountered difficulty in balancing the vapor flow across the plenum and into the various ducts, especially those farthest removed from the point at which the cooking vapor is discharged from the blower. One result is that food products, from side to side on the conveyor belt, are exposed to the cooking vapor at uneven rates resulting in certain products which are fully cooked, others overcooked and yet others substantially undercooked. This is typical where the gross cooking vapor flow is transversely to the movement of the product. Non uniformity is another result with the color variations indicating uneven cooking of the product from one side of the belt to the other. This is apparent when viewing the loaded conveyor belt. Such a situation gives an unacceptable standard for application in high quality commercial production operations and often leads to a great deal of wasted product rejected by the quality control department. Undercooked meats such as hamburger patties can carry live bacteria including E-coli which are very unsafe to human health.

Plenums or cooking air ducts positioned on the outside of the conventional commercially available impingement ovens are fed from a blower or fan typically arranged inside a shroud at the side of the principal air delivery plenum or enclosed duct. These ducts collect dirt such as grease, crumbs and other deposits from the cooking operations which must be cleaned out periodically. And moreover, in the use of the single blower assembly, consisting typically of a fan wheel and a fan drive motor, attempts have been made to balance the flow of cooking air into the distribution ducts farthest removed from the blower by tapering the walls, thus diminishing the cross-sectional area of the ducts. This is not entirely effective. In an attempt to balance or control air flow as between the streams directed to the top and to the bottom of the product, dampers are often employed in the external, enclosed ducts. Although dampers in the air distribution system may serve somewhat the objective of air flow balance, they cannot either increase or decrease the overall mass flow in the oven. The single blower is the limiting factor.

It has been found in the prior art that the interior oven surfaces between the air discharge orifices and the blower or fan intake cause turbulence within the cooking chamber. This further disrupts the return flow of the treatment vapor and even hinders the efficient heat distribution of the treatment vapor emitted from the orifices onto the product. It will be understood that after the cooking gases have issued from the orifices and impinged upon the product, ideally the gases should be removed as efficiently as possible from the vicinity of the product in order that the cooking gas' following behind will be permitted to engage the product and not be obstructed by stagnant or disordered circulation zones created within the oven proper. That situation or condition is undesirable from the standpoint of achieving efficient heat transfer from the circulating treatment air onto the products being cooked.

Following a completed cooking cycle the oven is cleaned and in many oven models this is a labor intensive process which absorbs considerable non operating or down time for the oven. Vapors and juices created in the cooking process frequently are deposited on the interior walls of the oven as well as in the vapor distribution ducts and require an opening up of the oven for cleaning and visual inspection. A highly desirable feature in an oven is the ability to clean the unit without necessarily opening up to expose the oven interior and with a highly reduces reliance on manual cleaning.

In view of these and other disadvantages that have been encountered in using the conventional, commercially available oven apparatus, an improved duct-less impingement oven is needed that will facilitate even distribution of the food treatment vapors across the conveyor belt for more even heat application to the products carried thereon, an oven which will afford substantially reduced turbulence therein, and wherein the return flow of the cooking vapors to the fan for the reticulation cycle will be within the oven proper and not through the hard to clean, usually invisible, interior surfaces of outside plenums or ducts.

SUMMARY OF THE INVENTION AND OBJECTS

According to the present invention, an improved impingement heating apparatus is provided without any outside ducts which comprises novel oven construction including an arrangement of oven elements adapted to provide substantially uniform side-to-side cooking gas distribution at very uniform velocities from nozzles unto the food products being treated.

According to one object of the invention, a novel arrangement of chambers is provided entirely within the oven shell that significantly improves the distribution of the process cooking vapor from upper and lower blowers or circulation fans, disposed to charge upper and lower chambers, with each blower's intake being arranged so as to receive circulated vapor from low-pressure corridors within the oven housing so that the vapor is channeled for good side-to-side cooking uniformity and wherein the gross flow of the cooking vapor is parallel to the product movement through the oven.

Another object of the invention is to provide an impingement oven wherein the circulation fans are located inside relatively higher-pressure chambers, eliminating the need for separately ducting the process vapor, for impinged onto the product through an array of nozzles in a manner that after discharged through the nozzles, the process vapor is circulated toward the outer side margins of the conveyor belt in a flow of much reduced turbulence and thereafter the vapor is directed into the intake of the circulation fans for reticulation.

Another object of the invention is to provide an oven of the type described wherein lower-pressure vapor recirculation channels are provided adjacent the oven side walls on each side of the nozzle arrays.

Still another object of the invention is to provide an air impingement oven wherein both the higher and lower pressure chambers are easily exposed for inspection and cleaning without the use of hand tools or the use of inspection doors.

Yet another object of the invention is to provide within an oven of the type described a system for circulating streams of water in the lower portion of the oven both to cool the metal surfaces, thereby materially reducing carbonaceous "burn-on", and to serve as a vehicle to capture rendered fat by-products and provide for their continuous removal from the oven.

Still another object of the invention is to provide in an oven of the type described means for independently controlling the mass flow of process vapor into the upper and the lower chambers without resort to dampers or air flow diverter baffles or the like.

In accordance with the foregoing object, independently controllable fans positioned in the upper and lower chambers permit a wide range of circulating vapor mass flow rates between the upper and the lower chambers and thence through the nozzles associated therewith.

Another object is to provide a design which enables process vapor circulation generally parallel to the product movement on the conveyor belt and affording very uniform vapor velocities transversely of the conveyor belt through impingement nozzles which are configured to provide very high nozzle efficiency while allowing for optimum return volume for the reticulated vapor to flow in an efficient flow pattern.

Another object of the invention is to provide an impingement nozzle structure in which the distance may be varied between the product and at least one of the nozzles sets.

Yet another object is to provide in the oven of the type described a conveyor belt support structures which coact with the lower impingement nozzles so as to maintain them in a sealing relationship with their associated higher pressure chamber.

Still another object is to provide in an oven of the type described a clean-in-place system which uses the blower fans, as well as all other vapor distribution and circulation elements, to circulate a cleaning solution and a rinse solution throughout the oven while affording the ability to regulate the cleaning time and temperature through use of the oven controls.

A further object is to provide a cooking process in an oven of the type described which admits a distinctive food flavoring constituent into the process cooking vapor so that the distinctive flavor may be imparted to the food product during the cooking cycle.

In connection with the above object it is intended to provide a smokehouse cooking process operating in the impingement oven disclosed herein for preparing link sausages, frankfurters and other products normally cooked in a smokehouse.

In summary, the invention comprises a high-speed air impingement oven with an outer housing equipped with product inlet and product outlet means. A product conveyor extends through the inlet and outlet. An inner housing is arranged within said outer housing and is dimensioned laterally so that its sidewalls are spaced apart from the adjacent sidewalls of the outer housing thus to define longitudinally extending low-pressure corridors along each sidewall of said inner housing. The inner housing comprises upper and lower chambers disposed above and below a conveyor belt and fan circulation means are arranged in said upper and lower chambers so that the fan inlets communicate with the low-pressure circulation corridors and the fan outlets communicate with the interior of the upper and lower chambers respectively and thereby serve to create therein a zone of relatively higher pressure. Nozzles arrays extend transversely of and project in a generally perpendicular direction toward the product conveyor belt from said upper and lower chambers with each nozzle array including a plurality of parallel risers spaced apart along the belt with each riser projecting away from the base portion in a taper merging into a substantially narrower distal surface extending laterally of and proximate to said conveyor belt. The narrower distal surface is provided with a skewed line of vapor discharge slots therein. Heating means and steam releasing means are provided in the housing and regulated to maintain a controlled temperature of the cooking vapor discharged from the nozzles.

Further objects and advantages of the invention will appear from a consideration of the illustrative drawings taken in connection with the detailed description which follows.

BRIEF DESCRIPTION OF THE DRAWINGS

FIG. 1 is an elevation side view of an impingement oven made in accordance with and embodying the principles of the present invention;

FIG. 2 is a transverse sectional view in elevation taken in the direction of the arrows 2—2 in FIG. 1;

FIG. 2a is a fragmentary schematic view showing oven cleaning solution directed onto the blower fan blades in an oven cleaning cycle.

FIG. 3 is a view in longitudinal section of a fragment of the oven taken generally in the direction of the arrows 3—3 in FIG. 2 and showing upper and lower air impulsion fans;

FIG. 7 is a perspective, diagrammatic view of a portion of the vapor delivery conduits in the lower part of the oven and illustrating a system for flowing water laterally along the conduits from a feed line to a retrieving channel.

DESCRIPTION OF THE PREFERRED EMBODIMENT

Figure 5:
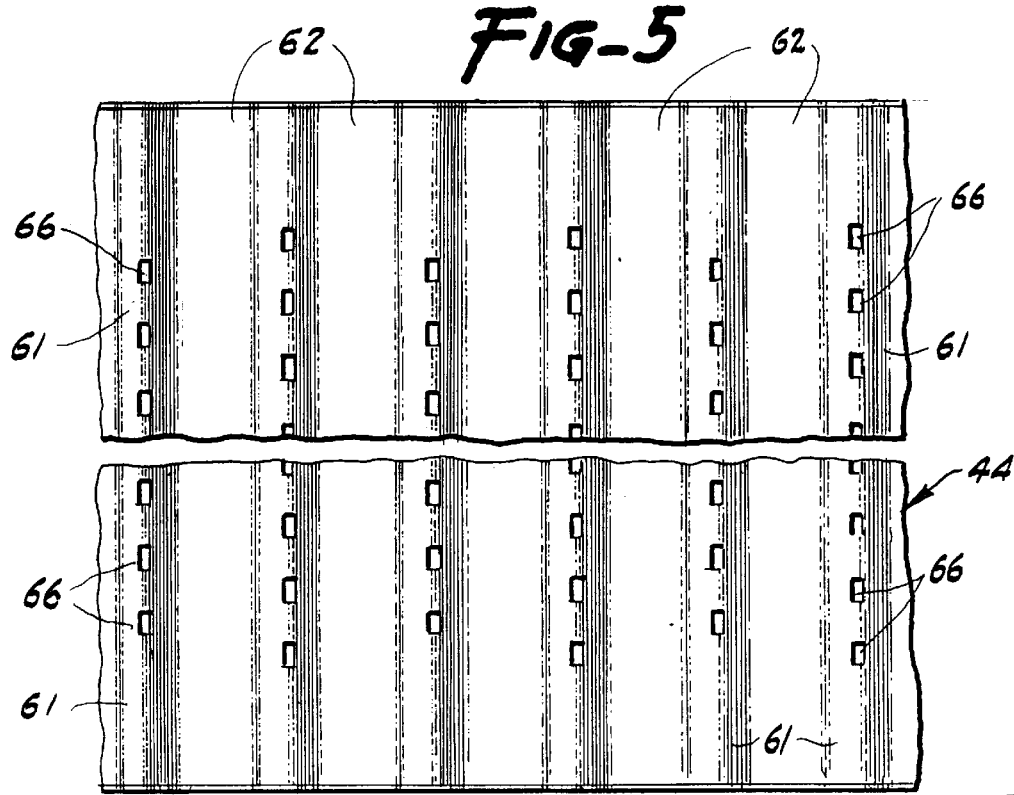
FIG. 5 is a view in the scale of FIG. 4 taken in the direction of the arrows 5—5 in FIG. 4.

Referring to FIGS. 1 and 2 of the drawings, there is shown an improved high-speed air impingement oven 10 made in accordance with and embodying the principles of the present invention. The impingement oven 10 includes a product inlet zone 11, a product outlet zone 12 and a continuous conveyor belt 13 of open mesh wire construction which extends through the inlet zone 11, through the oven body and through the outlet 12. The conveyor is shown configured for an outside belt return with provisions on the outside return run for cleaning the surface of the conveyor belt 13 through use of rotating brushes and cleaning liquids as is well known in this field. An inside return (not shown) for the conveyor belt 13, whereby the conveyor is almost entirely contained within the oven housing, provides efficiencies in certain applications and can be adopted without departing from the scope of this invention.

Both the oven inlet 11 and outlet 12 are provided with shroud means 14 which include an exhaust stack 16 equipped with a damper 17. When the oven 10 is installed in the food processing plant, each stack 16 is provided with air suction means (not shown) to furnish an updraft so as to withdraw ambient air through the inlet 11 and outlet 12 as well as a modicum of process vapor from the oven interior and to move the vapor up the stacks 16 so as to materially reduce the uncontrolled entry of ambient air into the cooking process carried on within the oven 10. Moreover, the continuous process carried on within the oven is thus controlled so as to be confined substantially within the oven cooking chamber while permitting very little in the way of emissions to escape into the food processing plant.

Referring particularly to FIG. 2, the oven 10 is configured to include an inner housing 21 and an outer housing 22. The outer housing 22 is supported on a frame 19 which includes vertical legs 23 and 24. The legs are equipped with upper housing lifting means 26 which serve to permit the hood 27 or upper oven portion to be raised selected distances to dispose the air impingement means therein at selected distances from the product (as will be described more fully below) and to be fully raised, separating the upper and lower oven portions, to facilitate visual inspection of the oven interior for periodic cleaning and maintenance work as is well understood in the field. The hood 27, includes a skirt 28 disposed at the lower margin of the hood sidewalls. A water holding trough 29 extends about the perimeter of the oven's cooking zone and furnishes a water seal between the upper 27 and lower 30 oven structures when in the closed condition as for cooking. The trough 29 is mounted on the oven frame 19 and positioned so that the skirt 28 of the hood 27, in the closed operative condition of the oven, extends into the trough 29. Normally, during oven operations, the trough 29 is filled with water. Similarly, the lower oven structure 30 is equipped with a flange portion 31, which extends into the trough 29 to effect sealing of the housing so as to contain the process cooking vapor to the cooking zone therein. Should an over-pressure develop within the housing, water in the trough would rise or would be expelled. The water seal thereby functions as a safety provision against an inadvertent over-pressure condition within the cooking zone within the oven. As may be seen from FIG. 3, the water seal between the hood and the lower oven structure 30 is provided on the lateral or end walls of the oven as shown to the right of FIG. 5.

As shown in FIG. 2, the inner housing 21 of the oven is configured so that its longitudinally extending sidewalls 36 and 37 are spaced laterally inwardly of the corresponding sidewalls of the outer housing 22. This spacing affords on each side of the oven interior a corridor 39 extending substantially the full cooking length of the oven.

Heating means 41, which may comprise gas or oil fired radiant tubes, are arranged in the corridors 39, the tubes 41 having a serpentine configuration as shown clearly in FIGS. 1 and 3. The heating means terminate in exhaust stacks 42, which serve to carry the products of combustion out of the food processing plant in which the oven 10 is located. Alternatively, the oven heating means 41 may comprise electric resistance or cal. rod heaters (not shown), direct open flame or a thermal fluid heat exchanging system and these heating means are well-known in the field. With suitable controls well known in the art, the oven may be heated to operate at temperatures from as low as 100° F. to as high as 600° F.

In the lower oven housing 30, the sidewalls 36, 37 are sealingly united to the bottom wall 15 of the outer housing. In the hood 27 or upper section of the oven, sidewall 36, 37 are sealingly united to the top wall 20 as shown best in FIG. 2. A lower nozzle plate assembly 44 is mounted with respect to the sidewalls 36, 37 in the lower portion of the oven 30. Taken together, the nozzle plate assembly 44, the sidewalls 36, 37 and the oven bottom 15 serve to define a lower chamber disposed inwardly of the side corridors 39.

To eliminate the need for clamping or bolting the nozzle plate assembly 44 to other oven structure in order to achieve an air seal with respect to the lower chamber, a novel arrangement has been devised. More specifically and referring to FIG. 2, the product conveyor support frame 13a and 13b of the belt conveyor 13 rest directly up on the nozzle plate assembly 44 insuring that margins of the plate assembly maintain sealing contact with the associated structures of the side walls 36, 37. Vertically extending support rods 40,45 are connected to the conveyor support frame and attach at their upper portions to the elevatable portions of the upper housing. As mentioned, the upper oven portion may be raised and the conveyor structure is as attached so as to move therewith. When raised the conveyor's weight is removed from the nozzle plate assembly 44 and it too can easily be dismounted for inspection or cleaning.

An upper nozzle plate assembly 46 is mounted with respect to the sidewalls 36, 37 in the upper portion of the oven and can be raised and lowered with the upper housing portion for selectively positioning the nozzles vertically a variety of desired distances, for example in a range of 2 to 8 inches, from the conveyor belt 13 and the products carried on it. Thus the intensity of air impingement upon the products can be varied and the treatment of the products can be controlled even while the oven is in operation. The upper nozzle assembly 46, together with the upper inner sidewalls 36, 57 and oven top 20 serve to define an upper chamber 47 disposed inwardly of the longitudinally extending side corridors 39, as shown clearly in FIG. 2. It will be seen from FIG. 2 that the lower horizontally extending portions of the sidewalls 36, 37 are equipped with in turned channel flanges 36*a* and 37*a*. The nozzle plate assembly 46 is equipped along its upper sidewall portions with outwardly turned channel shaped flanges 46*a* and 46*b*. The flanges are configured to nest in flanges 36*a* and 37*a* so that when the upper chamber is pressurized during fan operation the cooperating flanges 36*a*,37*a*,46*a* and 46*b* establish a seal between the nozzle plate and the chamber side walls thereby permitting a pressure differential to be created and maintained in the upper chamber 47 with respect to the corridors 39 or other portions of the oven.

A dual wheel, axial flow fan or blower assembly 48 is mounted in the lower chamber 45 and is arranged so that a fan air supply inlet 49 opens through each sidewall 36, 37 so that the blower 48 may withdraw air from the two side corridors 39 and discharge process vapor, as indicated by the arrows 50 in FIG. 3, into the lower chamber 45. The impeller for the fan or blower assembly 48 is mounted on a drive shaft 51, which is journalled in a centrally disposed bearing 52, which is mounted, for cooler operations on a central enclosure outside of the cooking environment, and an outside side bearing 53. An alternate construction is to rotatably support the impeller on a shaft mounted in outboard disposed bearings, it being understood that the cross-section of the shaft is selected to withstand the kinetic forces encountered in normal oven operation. A circulation fan satisfactory for the purposes of this invention is Model No. PRL 22, made by The New York Blower Company, 7660 S. Quincy St., Hinsdale, Ill. 60521.

The drive shaft 51 is driven from a motor 52 disposed outside of the outer housing. A motor satisfactory for the purposes of this invention is Model No. EB0254FFA, having a power rating of 25 HP, and made by Sterling Electric Motors Incorporated, 799 Rennie St. Hamilton, ON L8H 3R5, Ontario, Canada. The horsepower of the motor 52 is sufficient to move a substantial volume of process vapor (20,000 cubic feet per minute per blower assembly) at a pressure differential of 4 inches of water column between the outer corridors 39 and the lower chamber 45 at operating temperature. The process vapor issues through the vapor impingement nozzle assembly to be described in more detail below.

The upper chamber 47 is also provided with a dual wheel, axial flow blower fan 48 with air inlets 53 opening through the sidewalls 36, 37 so as to permit the heated process vapor to be withdrawn from the side corridors 39 for discharge into the upper chamber 47 as indicated by the arrows 50 in FIG. 3. The impeller for the fan 48 in the upper chamber 47 is mounted on a drive shaft 56 supported by bearing assemblies 57, 58 and driven from an electric motor 52. The motor 52 and blower 48, which may have the same operational characteristics as described above, function to withdraw process vapor from the side corridors so as to positively charge the upper chamber 47 with a constant supply of process vapor for discharge through the upper nozzle plate assembly 46. The operating pressure differential, normally 4 inches of water column, between the upper chamber 47 and the side corridors 39 may be regulated over a desired range by appropriate adjustment of the impeller rotational velocity through regulation of the driving speed of the motor 52.

Although we have illustrated one preferred location of the circulating fans 48 at nominally one end of the oven, we have found it to be equally practical to mount the fans in a central location of the oven, say midway along the oven length which would be the case when two of the ovens 10 are mounted end to end with the fans in the center.

Figure 4:
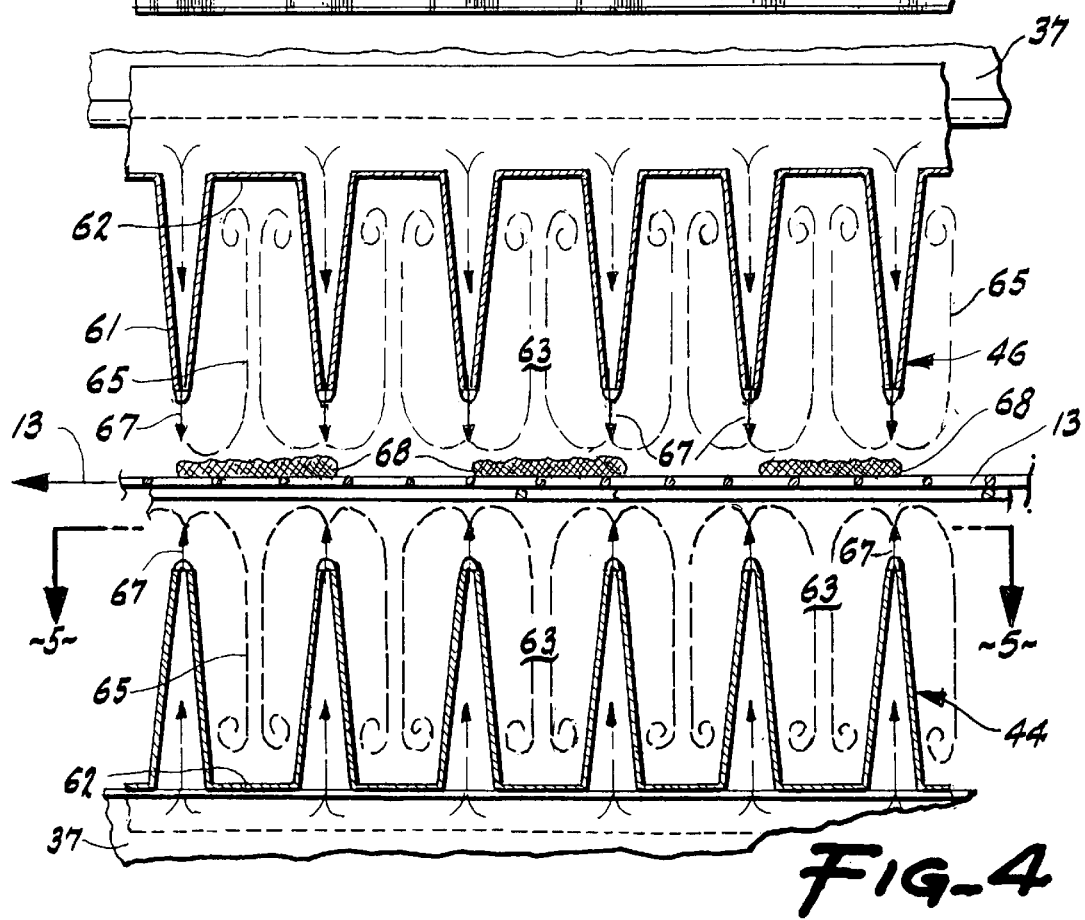
FIG. 4 is a view on an enlarged scale showing a fragmentary portion in an elevation taken along the conveyor belt and depicting upper and lower vapor delivery conduits and return channels.
Figure 6:
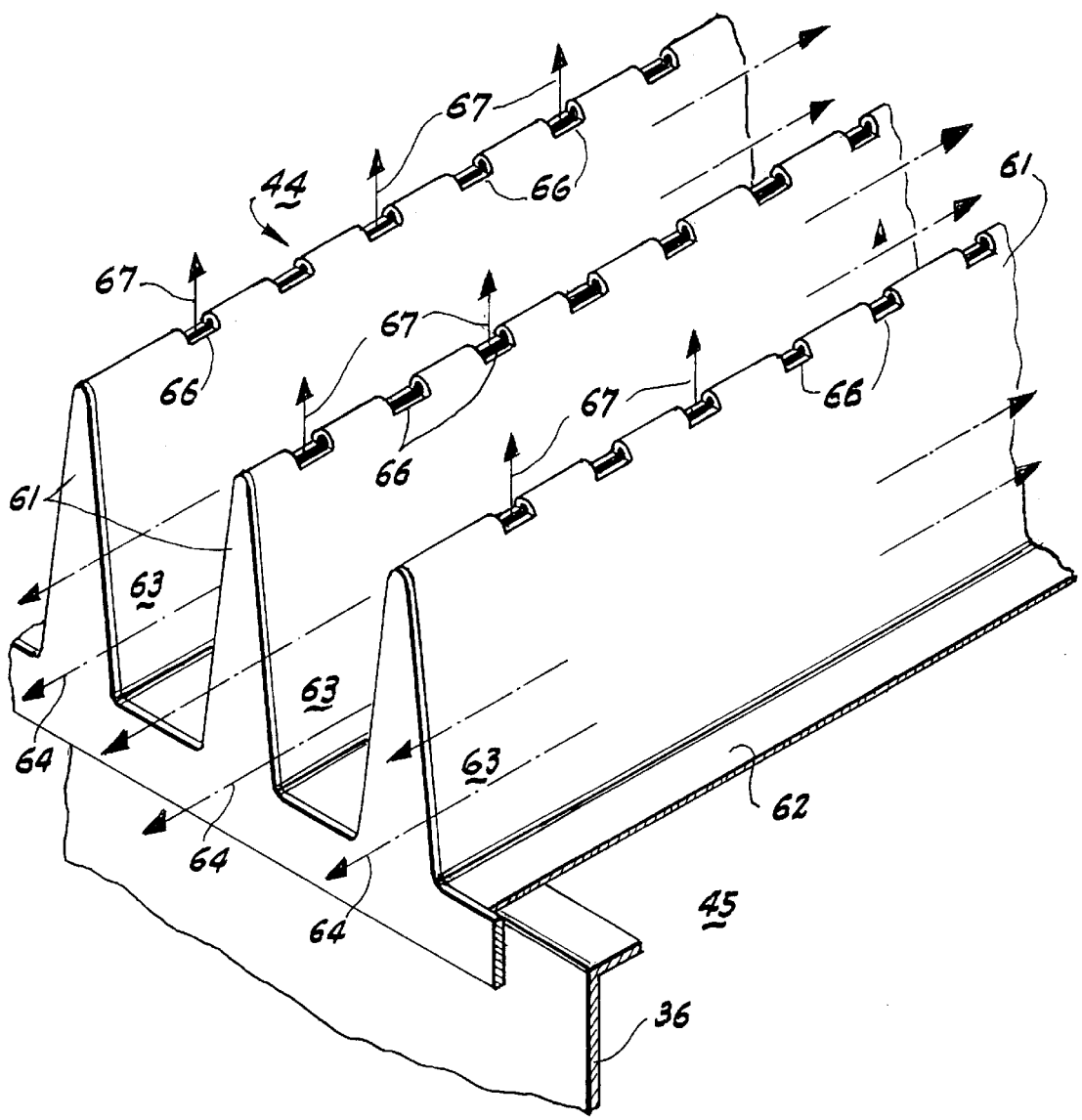
FIG. 6 is a perspective fragmentary view of three, Vee-section vapor delivery conduits or nozzle array with the return channels and further depicting the vapor flow patterns laterally of the conveyor belt and toward the product and thence parallel to product movement and generally toward the circulation fan inlets.

Referring to FIGS. 4, 5 and 6, the nozzle array structures 44, 46 contain the air distribution ports and comprise a plurality of Vee-shaped risers 61 which extends transversely of the conveyor belt 13. The risers 61 are spaced apart longitudinally of the belt, a distance approximately equal to ⅝ths of their height as measured from their base plate 62. That is to say, for example, should the risers be eight inches tall their spacing would be at a five inch pitch which would be typical for an oven with a 40 inch wide conveyor belt spanned by the structures 44, 46. Other spacings are useful so long as the configuration affords a substantial cross-sectional flow area between successive risers 61 and affords a low-pressure flow channel 63 which extends laterally across the riser assembly and communicates with the corridors 39 permitting process vapor to flow in the direction of the arrows 64, as shown in FIG. 6, at a velocity of about 1000 to 1500 feet per minute. The risers 61 taper from the base plate 62 to the aligned air discharge ports or slots 66 from which the process vapor exits from the plenum or chambers 45, 47 in the direction of the arrows 67, as indicated in FIGS. 4 and 6. It will be understood that the risers are ever decreasing in cross sectional area from the base plate 62 to the flow ports 66 and consequently the air velocity increases considerably in accelerated flow from the base plate to the discharge slots 66. A useful set of dimensions for the ports 66 is on the order of ⁵⁄₁₆×1 inch placed on 1¼ inch centers across the apex of the riser. The discharge ports or slots 66 are staggered from riser to riser as viewed longitudinally of the belt as shown in FIG. 6. The objective and purpose of this configuration is to permit controlled turbulent, long duration contact of the cooking gases with the products. Furthermore, in another preferred embodiment, some of the ports or slots 66 may be set at an angle (not shown) from the apex line so that one slot discharges in a vertical plane, the next slot discharges in a plane at an acute angle to the right and the next slot 66 discharges in a plane at an acute angle to the left of the apex line. The next slot is situated on the apex line and the sequence is repeated. This produces a scatter jet effect in the controlled turbulent, long duration contact of the cooking gases with the food products.

The process vapor discharges at a high velocity, on the order of 9000 feet per minute, through the slots 66 as indicated by the arrows 67 and impinges against the food product 68 supported on the conveyor belt 13, FIG. 4. The food product 68 maybe, for example, sausage, chicken patties, beef patties, meat loaf, meat balls, tortilla chips and similar products, chicken portions or even slices of bread being made into toast.

In summary, to set into operation the air impingement oven 10, the conveyor belt 13 is set into motion in the direction of the arrows 69 and food products 68 are arranged on the belt for cooking or other treatment, and are carried into the oven through the oven product inlet 11. The food products 68 passes beneath the shroud 14, which serves to maintain the inlet end of the oven in a neutral condition insofar as controlling air entry or process vapor exit from the oven. The heating unit 41 is actuated so as to bring the atmosphere of the oven to the desired operating temperature. Provisions are made in the oven for the entry of saturated or super heated steam through a steam delivery inlet line 70 as indicated by the arrow 71 (FIG. 1) from a source of steam in the operating plant (not shown). The steam supply may be regulated to achieve a desired moisture content in the process atmosphere in accordance with the principles set out in the assignee's issued U.S. Pat. No. 3,947,241, granted Mar. 30, 1976 and U.S. Pat. No. 4,167,585, granted Sep. 11, 1979. The two fan driving motors 52 are set into operation for driving the axial flow, dual wheel blowers 48 so as to withdraw process vapor from the side corridors 39 at the rate of about 1900 feet per minute as it moves toward the fan inlets 49, 53 for charging the upper and lower chambers 45, 47 with process vapor at a relatively higher pressure than that which exists in the corridors 39. The heated process vapor exists the chambers 45, 47 as impingement flow through the discharge slots 66 disposed at the tip or apex of the risers 61 at a velocity of about 9000 feet per minute. The process vapor, moving in the direction of the arrows 67, impinges against the food product 68 disposed about 2 inches from the nozzles and residing on the open mesh wire conveyor belt. This spacing can be varied to suit product cooking conditions. The heated process vapor engages the product in a rapid, turbulent flow and then abruptly moves away from the product carrying belt 13 into the deep return channels 63 disposed intermediate consecutive risers 61 in the flow pattern suggested by the broken lines 65, FIG. 4. Movement of the process vapor in the direction of the arrows 64, FIG. 6, is relatively less turbulent in flow due to the substantial depth of the channels 63 and the volume available therein for containing the process vapor which drops substantially in intensity and velocity before returning to the blower inlet in a reticulation pattern. The heat transfer efficiencies are unexpectedly high due to, it is believed, to the change in the direction of the acceleration of the vapor flow while in contact with the product and the reduced return velocities shortly after contact with the product. In the prior art ovens, it was found to be common to produce uneven cooking of the food products dispersed in various locations along the belt and this problem has been overcome in the subject oven 10.

The position of the upper nozzle assembly can be set at several different elevations with respect to the conveyor belt 13 when desired for adjusting and controlling the intensity of the vapor impingement upon the food products. A very useful range of nozzle distance from the products carried upon the belt 13 is between 2 and 8 inches. As mentioned above, the upper nozzle plate assembly is arranged to move in unison with the upper housing portion, the unit being lifted by the jack assemblies mounted in the legs 26. This capability together with the ability of selectively changing the speed of the conveyor belt and fan assemblies, the temperature and moisture content of the process vapor, affords excellent control over the cooking processes.

The food products are removed from the oven through the outlet shroud 14 and are removed from the outlet 12 for further processing such as cooling, chilling and packaging as is pertinent to the individual products, of which there are many, that can be treated within the oven 10.

A highly effective process step for imparting a smoke flavor to a food product cooked in the oven 10 is to introduce liquid smoke or a similar flavoring into the oven during the cooking process. A smoke generator and its constituents of a conventional type normally associated with a smoke house (not shown) is connected to the oven so as to inject the concentrated flavoring material either at the intake throat or on the high pressure side of at least one of the blower fans 48. The flavoring material is quickly completely vaporized and is carried along in the process vapor where in contacts the product at a high velocity and is hereafter reticulated to repeatedly contact the product. The amount of flavoring material injected into the process stream is controlled so that neither over-flavoring or under flavoring is found in the product. Because the flavoring is distributed to the products laterally as the conveyor belt moves through the oven 10, there is a uniformity of treatment from side to side of all products on the belt. Thus there are very few products which are over flavored or over cooked as well as the converse situation in the operation of the impingement oven 10. Sausage (both link and paddy form), frankfurters, ribs and the like products usually prepared in a smoke house cabinet can as well be cooked in the subject process and oven.

EXAMPLES

Examples of products which have been successfully cooked within the oven 10 include sausage patties formed into a 3-inch diameter round shape, approximately ⅜-inch in thickness with a raw weight of 58 grams. The patty was cooked with very good color and yield with a cook time of 1.5 minutes. The oven temperature, dry bulb, was 425° F. and the wet bulb temperature was 205° F. or 80 percent moisture content in the process vapor. The product temperature was 158° at the end of the test with a yield of 86 percent.

Sausage patties were cooked for 1.5 minutes in a batch of 12 pieces having a weight of 744 grams in another example. The internal temperature of the patties at the beginning of the cook run was about 300° F. The impingement oven was operated at 325° F. dry bulb temperature with the process atmosphere of about 70 percent moisture. The impingement nozzles were positioned 2 inches from the belt 13 and the fan blowers operated at 35 percent of their rated capacity. The product internal temperature at the end of the cook run was in the range of 160–165° F. and the final product weight was 668 grams giving a yield of 89.8 percent. The product size was a patty initially of about 3.75 inches by 4.5 inches by 5/16 inch in thickness with a nominally 60 grams each raw weight. In another example, patties of a similar size and weight were cooked in the oven disclosed herein in a batch of 29 pieces with an initial weight of 1767.5 grams and having an internal temperature of 42° F. The cooking time was 0.8 minutes with a dry bulb temperature of 525° F. and a 20 percent moisture content of the process atmosphere. The nozzles were positioned at 2.2 inches from the conveyor belt and the fan speeds were maintained at 95 percent of operational capacity. The product exit temperature was in the range of 165–175° F. with a batch weight of 1460 grams affording a yield of 82.6 percent. The patties were light to medium brown in color and the yield was considered acceptable. The color characteristics of the product were uniform across the conveyor belt.

As a further example, beef and pork meatballs were cooked with the oven apparatus of the present invention. Meatballs, because of their thickness and generally spherical configuration, cannot be cooked with high oven temperatures and high fan speeds as this would produce a product that was too dark on the outside and either under or overcooked on the inside, depending on the dwell time. However, meatballs were cooked to a good color with a uniform internal temperature across the belt and comprised a batch of ½ ounce meatballs with a total weight of 621 grams. The batch had an internal temperature in the range of 42–50° F. The cook time was 2.5 minutes with an oven temperature of 400° F. dry bulb at 60 percent moisture of the circulating atmosphere. The nozzle height was 3 inches above the belt and the fan speed was 85 percent on the upper fans and 80 percent on the lower fans. The exit product temperature internally was in the range of 166–168° F. The exit batch weight was 5253 grams with a yield of 84.6 percent.

An example of an application where the oven of the present invention can be used to develop surface color in a short period of time concerns a chicken product. This product was a boneless, skinless chicken breast and the chicken meat was marinated with a mesquite flavored marinade. A batch of 4 pieces weighing 830 grams and having a 45° F. internal temperature had been precooked in steam to have an internal temperature in the range of 95–118° F. Then the products were introduced into the oven of the present invention for a very short cook time of 0.8 minutes. The oven temperature was 540° F. dry bulb with 45 percent moisture content. The nozzle spacing was 2.2 inches and the fans operated at 100 percent of rated speed. The product exit temperature was in the range of 150–175° F. with a product weight of 718.7 grams. The yield was 85.6 percent. Even at the short dwell time of 0.8 minutes, the product had a very good color lending an appetizing appearance to the product.

The oven of the present invention can be used to perform a process like that performed in the conventional smoke house. More particularly, in a smoke house the product is "soaked" in a relatively low temperature heat environment for a substantial period of time so that the product can absorb the smoke to impart the desired color and smokey aroma to the product. A chicken product comprising Cornish hen halves were successfully treated to have the desired color aroma and smokey taste. The initial product weight was 27 grams at an initial temperature of 46° F. The cooking time was 21 minutes, in two oven passes, with a dry bulb temperature set initially at 260° and for the second pass at 300° F. The air delivery nozzles were positioned at a height of 6 inches from the product and the fan speeds were 45 to 50 percent of capacity. A smoke generator introduced the smoke material into the inlets of the oven blower fans through the nozzles 101, as shown in FIG. 2. Exit temperature of the product was between 178 and 190° F. and the yield was 76 percent. The cooking time is substantially shorter than if the product were cooked in the conventional smoke house cabinet. The foregoing technique has also been successfully used in connection with sausages in a cellulosic casing as well as with frankfurters. The heat transfer in the oven 10 and the smoke application sets the product into the desired texture with an acceptable appearance and it is cooked to the desired end temperature.

Yet another example of a process enabled by the present invention is one of comparatively slow cooking of a product such as whole meatloaf. The meatloaf product had an initial temperature of 45° F. and a weight of 197 grams. The dry bulb temperature of the oven was 300° F. and the wet bulb set at 55 percent moisture content. The nozzles were spaced 6 inches from the product carrying belt and the fans operated between 45 and 50 percent of their capacity. The total processing time of the product in the oven was 43.2 minutes, in four runs of about 10.8 minutes each. The product exit temperature was at the desired 166° F. and the yield was 82 percent.

From the above examples and description of the oven, it should be readily apparent that the oven system described herein provides rapid heat transfer to food products and that the heat transfer can be well distributed over the surface of irregularly-shaped products, such as chicken thighs, chicken breasts, meat balls and meat loaf. The heating time can be substantially less than that required by other cooking systems and the surface color can be readily developed as desired. Smoke flavoring or the like can be imparted to food products during cooking in this oven so as to develop quickly and accurately the desired smoke flavor even while cooking proceeds.

An important operational feature of the oven 10 is the clean-in-place system. Normally, ovens use to process meat containing products or the like must be completely cleaned periodically to comply with governmental inspections for compliance with hygiene and health regulations. Cleaning entails usually at least a partial disassembly and manual scrubbing of all oven parts that are coated with grease, burn-on or the like—a labor intensive and costly operation in terms of lost production time. The oven 10, on the other hand, can be substantially cleaned in the hood closed condition, as shown in FIG. 2. Cleaning fluid injectors 102 are focused into the intake side of the fans 48 (FIG. 2) so as to deposit cleaning fluids, on the order of 50 gallons per minute, while the fans are in operation. Liquid spray balls 103 positioned at the fan 48 discharge distribute the cleaning or rinsing liquid throughout the oven. The action of the liquid on the fan blades is shown schematically in FIG. 2a. The cleaning fluid may be maintained at a controlled temperature with the use of the heating elements 42. Fan speeds are controlled so as to drive the cleaning solution to all parts of the oven 10 contacted by the process vapor. This causes a removal of grease and other undesirable contaminants deposited in the oven from the prior cooking operations. Caustic is an ingredient of the cleaning solution and hence a clear water solution is used as a rinse to remove the vestiges of cleaning solution before the oven is opened for visual inspection and touch-up cleaning where needed.

A savings of time and labor is achieved through application of this cleaning process which utilizes the operative air generating, heating and circulating components of the oven. The nozzles 101 are arranged in a fluid delivery circuit couple to an outside source of water pressure. A drain (not shown) in the low part of the bottom of the oven serves to remove the cleaning and rinse fluids from the unit for either recirculation by a pump or for final disposal.

The cleaning of the oven can be achieved with the oven halves in the usual operating position through a system wherein cleaning solutions are injected into the impeller fans so as to establish a cleaning cycle followed by a rinse cycle wherein rinsing solutions are similarly introduced into the oven Meanwhile, the fan circulating and heating components are controlled to achieve an efficient cleaning of all air exposed surfaces in the oven.

Referring specifically now to FIG. 7, a water-flow system is provided within the oven for the removal and retrieval of fat products rendered from fatty meats being treated in the oven. It will be understood that pork products, such as bacon, contain a substantial amount of lard which during the normal cooking process will be rendered out into liquid fat. In the case of the present oven the fat will drip from the product carrying conveyor onto the metal portions there below. If uncontrolled, the fat products in the oven will either combust causing a flame which is a serious safety hazard or would generate smoke which may be undesirable because it will impart an off-taste to the product. The water flow system which counteracts the above fat flow issues comprises a water delivery conduit 71 which extends longitudinally on the oven and is coupled to an external water supply, not shown. At intervals along the water delivery conduit 71, there are provided discharge nozzle 72 directing water flow to the valleys between adjacent Vee's nozzle arrays, the water flowing as indicated by the arrows 73 in FIG. 7. A water retrieval trough 74 positioned below the nozzle array and inclined from the horizontal, longitudinally toward one end of the oven receives the water after it has traversed laterally from the nozzle array thereby cooling the metallic surfaces to a temperature where the deposit of carbonaceous materials is substantially minimized. The direction of the return water flow is indicated by the arrow 77. A lip 76 is provided on the side of the nozzle array adjacent to the water feed so that a flow of water up to ⅜ of an inch may be accommodated in the troughs between the nozzle risers.

It will be recognized that the conveyor belt is disposed above the parts depicted in FIG. 7 and will be understood that liquid fat rendered from a pork product, for example, will fall through the wire mesh conveyor belt into the troughs between adjacent nozzle arrays. There the fat drops will be captured by the water moving in the lands between the nozzle arrays and flowing into the retrieval trough 74 for removal from the oven and for use as a by-product of the, for example, bacon cooking operation. The operational speed of the air circulating fans is adjusted to about 50% of their normal speed so as not to cause the water flow in the channels to disperse throughout the oven proper to any material degree.

An example where the water cooled oven bottom and fat drippings retrieval system was used in the oven 10 equipped as described above is as follows.

A batch of bacon scraps weighing about 300 pounds was loaded progressively onto the continually moving oven conveyor belt at a belt loading of about 2 pounds per square foot. The conveyor belt was 24 inches wide and the cook length was 135 inches. The belt processing speed was 33.75 inches per minute and the cooking dwell time in the oven was 4 minutes giving a production rate of 11.25 pounds per minute. The oven dry bulb temperature was 380° F. and the moisture content of the cooking atmosphere was approximately 70%. The cooling water for the fat collection flowed at the rate of 1.15 gallons per minute across the "lands" or valleys between the nozzles arrays and flowed laterally of the conveyor belt. Exiting the oven, the bacon product represented only 38% of its initial weight or a 62% weight loss, this being fats rendered in the process. The rendered fat was collected in the flowing water and separated out at an average rate of 5.27 pounds per gallon of the flowing water. It was determined that 92% of the fat was recovered for use as a byproduct of the total fat rendered from the bacon product.

While the disclosure of the examples, structure and operation of the cooking system herein has been such as to teach those skilled in the art the principles of the applicants' development, the true scope of the invention will not be limited except as set out in the claims below.

What is claimed:

1. A method of cooking food products by impinging a process vapor on the products, comprising the steps of providing an oven including a housing having an inlet for food products to
    be cooked in the oven and an outlet for emitting food products from the oven thereby defining a food product travel path, passing food products into the housing upon a conveyor of generally permeable construction, impinging a cooking process vapor upon the food products from above and from below the conveyor from a plurality of vapor emitters, spaced apart along and extending laterally of the product travel path for a treatment time within the oven,
    recirculating the process vapor first between adjacent vapor emitters and laterally of the product travel path, and then longitudinally of the travel path towards one end of the oven housing, heating the process vapor as it courses longitudinally of the product travel path, providing blower fans with intakes arranged laterally of the travel path and disposed at the oven end, causing the process vapor to move through the fan intakes and thence into the vapor emitters and removing the cooked food products from the housing and the conveyor.

2. The method of claim 1 wherein the process vapor is discharged substantially uniformly in the lateral direction of the products at a rate of about 9000 feet per minute.

3. The method of claim 1 wherein the process vapor is recirculated (recirculates) to the fan intakes in a stream on each side of the product path.

4. The method of claim 2 wherein the process vapor engages the products at a temperature in the approximate range of about 260 to about 540° F.

5. The method of claim 2 wherein the process vapor engages the products for a period of time in a range of about 0.8 minutes to about 44 minutes.

6. The method of claim 2 wherein the products laterally across the conveyor are cooked to a uniform internal temperature and to a uniform external color.

7. The method of claim 2 wherein the process vapor is heated by contact with a radiant energy heat source.

8. A continuous method of cooking food products, comprising the steps of providing an oven including a housing having an inlet for food products to be cooked and an outlet through which food products leave the oven, the oven being provided with a conveyor of generally permeable construction extending through the oven inlet and outlet, loading onto the conveyor food products to be cooked in the oven and conveying them into the oven, creating a process vapor in the oven at a predetermined temperature and humidity for cooking the food products, dispersing the process vapor in a plurality of high speed streams projecting substantially normal to the general plane of the conveyor from above and from below the conveyor, such streams extending substantially laterally across the full width of the conveyor, thereafter collecting the process vapor in corridors disposed alongside the conveyor and moving the vapor at a substantially slower speed to a blower, heating the process vapor in the corridors and removing the cooked food products from the conveyor.

9. The method of claim 8 wherein the process vapor is circulated from one end of the oven in successive streams extending laterally of the conveyor and returned towards said one end of the oven in at least two streams extending longitudinally of the conveyor.

10. A method of cooking food products by impinging a process vapor on the products, comprising the steps of providing an oven including a housing having an inlet for food products to be cooked in the oven and an outlet through which the cooked food products are emitted from the oven thereby defining a food product travel path,
    passing food products into the housing upon a conveyor of generally permeable construction,
    impinging a cooking process vapor upon the food products from above and from below the conveyor at a first velocity from a plurality of vapor emitters, spaced apart along and extending laterally of the product travel path for a treatment time within the oven, providing blower fans with intakes arranged laterally of the travel path,
    recirculating the process vapor first between adjacent vapor emitters and laterally of the product travel path, and then longitudinally of the travel path towards the blower fans intakes at a second velocity substantially slower than the first velocity, heating the process vapor as it courses longitudinally of the product travel path, causing the process vapor to move through the fan intakes and thence into the vapor emitters and removing the cooked food products from the housing and the conveyor.

11. The method of claim 10 and further including the step of entraining a distinctive food flavoring constituent into the process vapor for applying to the food product carried upon the conveyor so as to flavor the food product distinctively while it is cooking.

12. The method of claim 11 wherein the distinctive food flavoring constituent consists of a smoke flavoring material.

13. The method of claim 10 and further including the step subsequent to the food removal step of injecting into the blower fans a volume of liquid cleaning solution and circulating the cleaning solution through the oven in the vapor flow path until the internal oven surfaces are substantially cleaner than before this cleaning step.

14. The method of claim 13 and further including the step of injecting a rinsing solution into the blower fans and circulating the rinsing solution through the oven in the vapor flow path until the internal oven surfaces are substantially devoid of the cleaning solution.

15. The method of claim 8 wherein the food product to be cooked includes a substantial amount of fat to be rendered out during the cooking of the food product, providing in the oven a plurality of streams of water flowing below the conveyor generally laterally across the full with of the conveyor and disposed to receive and collect the fat rendered from the food product, flowing the fat and water together to one side of the oven, then flowing the water and fat together longitudinally of the oven, then removing the water and fat together from the oven and then separating the rendered fat from the water.

16. The method of claim 15 wherein each of the streams of water flows intermediate two adjacent high speed streams of process vapor below the conveyor and the water is maintained at a temperature substantially below that of the process vapor thereby serving to cool the lower portions of the oven to reduce the burn on of carbonaceous materials on the interior surfaces of the oven.

\* \* \* \* \*